(12) United States Patent
Nishimori

(10) Patent No.: US 7,876,077 B2
(45) Date of Patent: Jan. 25, 2011

(54) CONTROL CIRCUIT AND CONTROL METHOD OF CURRENT MODE CONTROL TYPE DC-DC CONVERTER

(75) Inventor: Eiji Nishimori, Kasugai (JP)

(73) Assignee: Fujitsu Semiconductor Limited, Yokohamo (JP)

(*) Notice: Subject to any disclaimer, the term of this patent is extended or adjusted under 35 U.S.C. 154(b) by 0 days.

(21) Appl. No.: 11/185,783

(22) Filed: Jul. 21, 2005

(65) Prior Publication Data
US 2006/0202669 A1 Sep. 14, 2006

(30) Foreign Application Priority Data
Mar. 10, 2005 (JP) ............... 2005-067355

(51) Int. Cl.
*G05F 1/00* (2006.01)
(52) U.S. Cl. ...................... 323/282; 323/284
(58) Field of Classification Search ............... 323/283, 323/207, 241, 271, 282, 284, 285, 286, 287; 363/16, 15, 1, 117
See application file for complete search history.

(56) References Cited

U.S. PATENT DOCUMENTS

| | | | | | |
|---|---|---|---|---|---|
| 4,426,734 | A | * | 1/1984 | Tults et al. | 455/180.3 |
| 5,481,178 | A | * | 1/1996 | Wilcox et al. | 323/287 |
| 5,731,731 | A | * | 3/1998 | Wilcox et al. | 327/403 |
| 5,734,259 | A | * | 3/1998 | Sisson et al. | 323/282 |
| 5,739,709 | A | * | 4/1998 | Banno | 327/156 |
| 5,939,871 | A | * | 8/1999 | Tanaka | 323/285 |
| 6,157,182 | A | * | 12/2000 | Tanaka et al. | 323/284 |
| 6,183,918 | B1 | * | 2/2001 | Nishiki | 430/22 |
| 6,396,252 | B1 | * | 5/2002 | Culpepper et al. | 323/285 |
| 6,580,258 | B2 | * | 6/2003 | Wilcox et al. | 323/282 |
| 6,873,140 | B2 | * | 3/2005 | Saggini et al. | 323/283 |
| 6,922,042 | B2 | * | 7/2005 | Umemoto et al. | 323/283 |
| 7,180,274 | B2 | * | 2/2007 | Chen et al. | 323/222 |
| 2006/0061343 | A1 | * | 3/2006 | Lipcsei et al. | 323/283 |

FOREIGN PATENT DOCUMENTS

| | | |
|---|---|---|
| JP | 11-041924 | 2/1999 |
| JP | 2003-244953 A1 | 8/2003 |
| JP | 2004-040856 A1 | 2/2004 |
| JP | 2004-248374 A1 | 9/2004 |
| JP | 2005-039925 A | 2/2005 |

* cited by examiner

*Primary Examiner*—Bao Q Vu
*Assistant Examiner*—Nguyen Tran
(74) *Attorney, Agent, or Firm*—Arent Fox LLP (57) ABSTRACT

The invention presents a control circuit and a control method of DC-DC converter capable of suppressing subharmonic oscillation of coil current even if the on-duty is over 50%. An error amplified signal V1 is an output voltage of an error amplifier ERA1. An offset voltage unit Ve2 outputs a lower limit set voltage V2 obtained by subtracting offset voltage e2 from error amplified signal V1. A voltage comparator COMP2 compares lower limit set voltage V2 output from offset voltage Ve2, and output voltage signal VIL. When the voltage value of output voltage signal VIL is decreased to lower limit set voltage V2 (region E2), the output of voltage comparator COMP2 changes from low level to high level. As a result, main transistor FET1 is set in conductive state. On the other hand, when the voltage value of output voltage signal VIL reaches an error amplified signal V1 (region E1), main transistor FET1 is set in non-conductive state.

6 Claims, 12 Drawing Sheets

CIRCUIT DIAGRAM OF DC-DC CONVERTER CONTROL CIRCUIT 11a

FIG. 1 CIRCUIT DIAGRAM OF DC-DC CONVERTER CONTROL CIRCUIT 11b

FIG. 2

WAVEFORM DIAGRAM OF CORRECTION VOLTAGE SIGNAL VIS IN DC-DC CONVERTER CONTROL CIRCUIT 11b

FIG. 3  CIRCUIT DIAGRAM OF DC-DC CONVERTER CONTROL CIRCUIT 11

FIG. 4 WAVEFORM DIAGRAM OF OUTPUT VOLTAGE SIGNAL VIL IN DC-DC CONVERTER CONTROL CIRCUIT 11

FIG. 5  CIRCUIT DIAGRAM OF DC-DC CONVERTER CONTROL CIRCUIT 11a

FIG. 6 CIRCUIT DIAGRAM OF PERIOD COMPARATOR 30

FIG. 7

CIRCUIT DIAGRAM OF VOLTAGE COMPARATOR COMP2 AND OFFSET ADJUSTMENT CIRCUIT 42

FIG. 8

TIMING CHART (1) OF PERIOD COMPARATOR 30

FIG. 9

TIMING CHART (2) OF PERIOD COMPARATOR 30

FIG. 10

CIRCUIT DIAGRAM OF DC-DC CONVERTER CONTROL CIRCUIT 11c

FIG. 11 PRIOR ART
CIRCUIT DIAGRAM OF CONVENTIONAL STEP-DOWN DC-DC CONVERTER

FIG. 12  PRIOR ART
WAVEFORM DIAGRAM OF CONVENTIONAL DC-DC CONVERTER CONTROL CIRCUIT

CONTROL CIRCUIT AND CONTROL METHOD OF CURRENT MODE CONTROL TYPE DC-DC CONVERTER

CROSS-REFERENCE TO RELATED APPLICATIONS

This application is based upon and claims the benefit of priority from each of the prior Japanese Patent Application No. 2005-067355 filed on Mar. 10, 2005, the entire contents of which are incorporated herein by reference.

BACKGROUND OF THE INVENTION

1. Field of the Invention

The present invention relates to a control circuit and a control method of current mode control type DC-DC converter, and more particularly to prevention of subharmonic oscillation in the event of on-duty exceeding 50%.

2. Description of the Related Art

Figure 11:
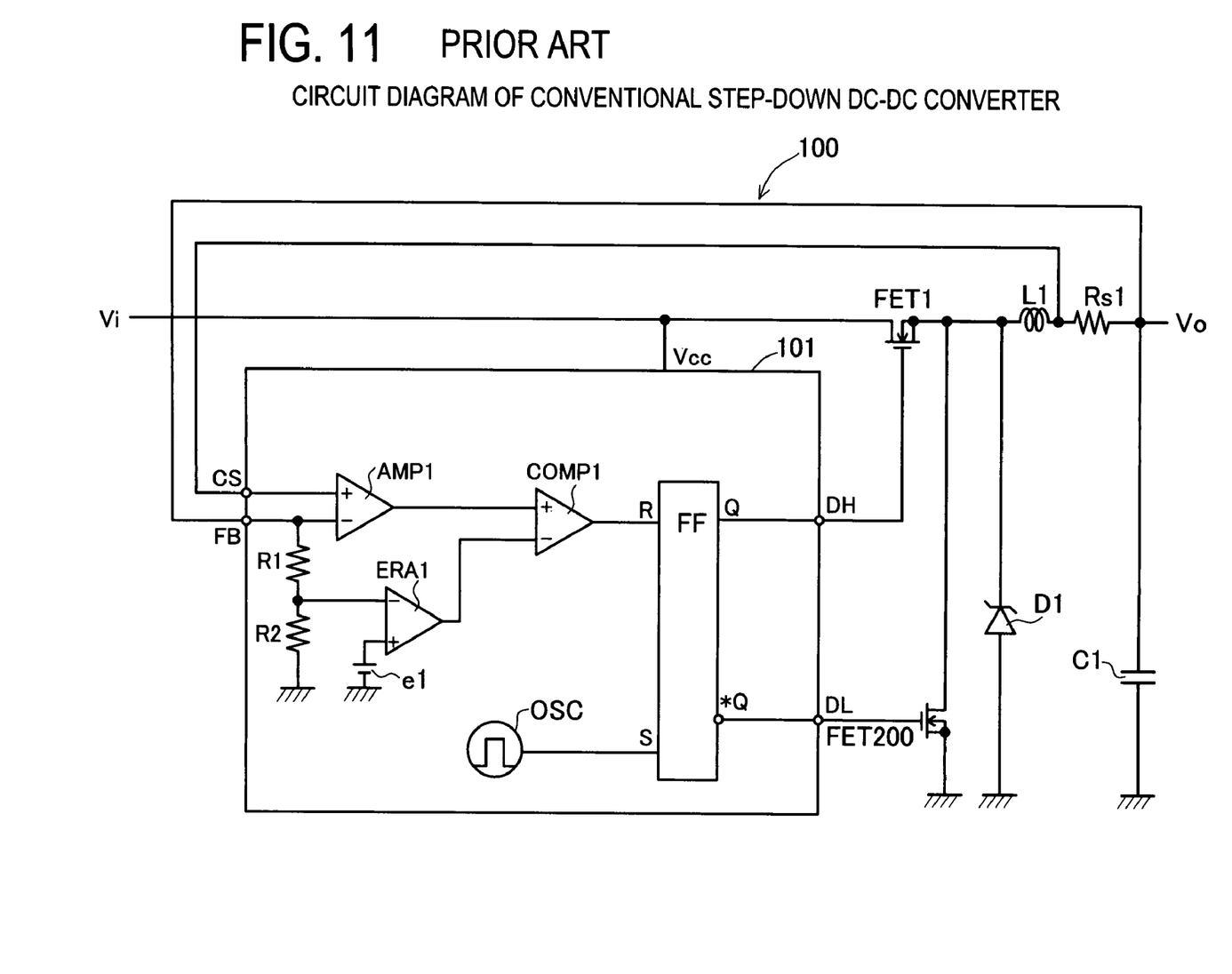
FIG. 11 is a circuit diagram of conventional step-down DC-DC converter.

A current mode control type DC-DC converter for duty control by detecting the current flowing in a choke coil and turning off and controlling the main switching transistor is likely to induce subharmonic oscillation when the on-duty exceeds 50%. FIG. 11 is a diagram of a conventional current mode control type DC-DC converter 100. FIG. 11 is a circuit diagram of a general step-down DC-DC converter of current mode control type. A DC-DC converter control circuit 101 is a control circuit for controlling the entire DC-DC converter 100. The DC-DC converter 100 comprises a main transistor FET1, a choke coil L1, a synchronous rectifying transistor FET2, a flywheel diode D1, a capacitor C1, and a current sense resistor Rs1.

The operation is explained. The main transistor FET1 conducts when the peak value of coil current IL flowing in the choke coil L1 reaches a specified value. This operation is executed by comparing the output voltage of error amplifier ERA1 and output voltage of voltage amplifier AMP1 by voltage comparator COMP1. The main transistor FET1 does not conduct in a specified period depending on the output signal from oscillator OSC. That is, the main transistor FET1 is turned off regardless of the coil current IL.

Related technologies are disclosed in Japanese unexamined patent publication No. 2004-248374, Japanese unexamined patent publication No. 2004-40856, Japanese unexamined patent publication No. H11 (1999)-41924, and Japanese unexamined patent publication No. 2003-244953.

SUMMARY OF THE INVENTION

The current control type DC-DC converter 100 operates stably while the on-duty of the main transistor FET1 is equal to or lower than 50%. However, problems occur when the on-duty exceeds 50%.

Figure 12:
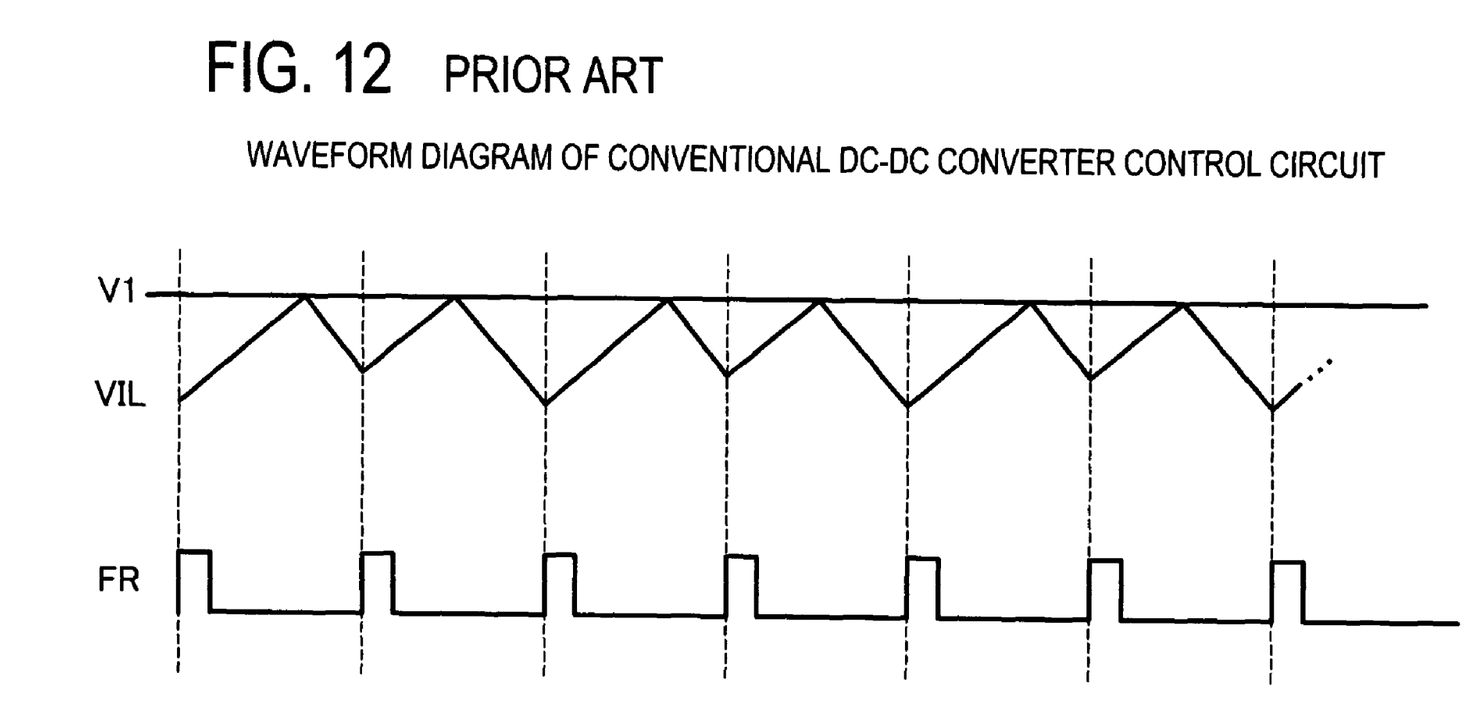
FIG. 12 is a waveform diagram of conventional DC-DC converter control circuit.

In the case of on-duty of 50% or over, waveform diagrams of output voltage signal of error amplifier ERA1 and voltage amplifier AMP1 are shown in FIG. 12. Output voltage signal VIL is an output voltage of voltage amplifier AMP1. Output voltage signal VIL is proportional to coil current IL. Error amplified signal V1 is an output voltage of error amplifier ERA1. In FIG. 12, the upper limit of output voltage signal VIL is set constant by error amplified signal V1. However, the lower limit of output voltage signal VIL is determined by reference clock signal FR output from oscillator OSC, and hence is not a constant value. Further, as shown in FIG. 12, since the bottom value of output voltage signal VIL varies like big waves, and is hence in subharmonic oscillation state. As a result, the operation becomes unstable.

The invention is devised to solve at least one of the problems of the background art, and it is hence an object thereof to present a DC-DC converter control circuit and a DC-DC converter control method capable of preventing drop of output current and preventing subharmonic oscillation of coil current even if the on-duty exceeds 50%.

To achieve the above object, there is provided a current mode control type DC-DC converter control circuit comprising: a current detector for detecting a coil current value flowing in a choke coil, a first setting unit for determining an upper limit value of the coil current value, a second setting unit for determining a lower limit value of the coil current value, and a comparator for comparing the coil current value and upper limit value and outputting a signal to set a main transistor in non-conductive state when detecting the coil current value higher than the upper limit value, or comparing the coil current value and lower limit value and outputting a signal to set the main transistor in conductive state when detecting the coil current value lower than the lower limit value.

The current detector detects a coil current value flowing in the choke coil. The first setting unit operates to determine the upper limit of the coil current value. The second setting unit operates to determine the lower limit of the coil current value. The comparator compares the coil current value and the upper limit, and detects when the coil current value exceeds the upper limit, and outputs a signal not to conduct a main transistor. The comparator also compares the coil current value and the lower limit, and detects when the coil current value falls below the lower limit, and outputs a signal to conduct the main transistor.

According to another aspect of the invention, there is provided a current mode control type DC-DC converter control method comprising: a step of detecting a coil current value flowing in a choke coil, a step of determining an upper limit value of the coil current value, and a step of determining a lower limit value of the coil current value, wherein the coil current value and the upper limit value are compared, and a main transistor is set in non-conductive state when detecting the coil current value higher than the upper limit value, and the coil current value and the lower limit value are compared, and the main transistor is set in conductive state when detecting the coil current value lower than the lower limit value.

Hence, the DC-DC converter control circuit and DC-DC converter control method of the invention are intended to control the coil current IL directly so that the lower limit of the coil current may become the lower limit determined by the second setting unit. As a result, the lower limit of the coil current can be set uniformly at a constant value. Hence, in the current mode control type DC-DC converter for turning off and controlling the main transistor by detecting the current flowing in the coil, even if the on-duty exceeds 50%, subharmonic oscillation of coil current can be prevented.

Further, when detecting the coil current value in the current detector, it is not necessary to make correction such as slope compensation regardless of the detected coil current value. Hence, in a region of on-duty exceeding 50%, the amount of current of the coil current actually flowing in the coil can be detected correctly. Therefore, subharmonic oscillation of coil current is prevented, and drop of output current can be prevented at the same time.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE SEVERAL VIEWS OF THE DRAWING

FIG. 5 is a circuit diagram of DC-DC converter control circuit 11a;

DETAILED DESCRIPTION OF THE PREFERRED EMBODIMENTS

Figure 1:
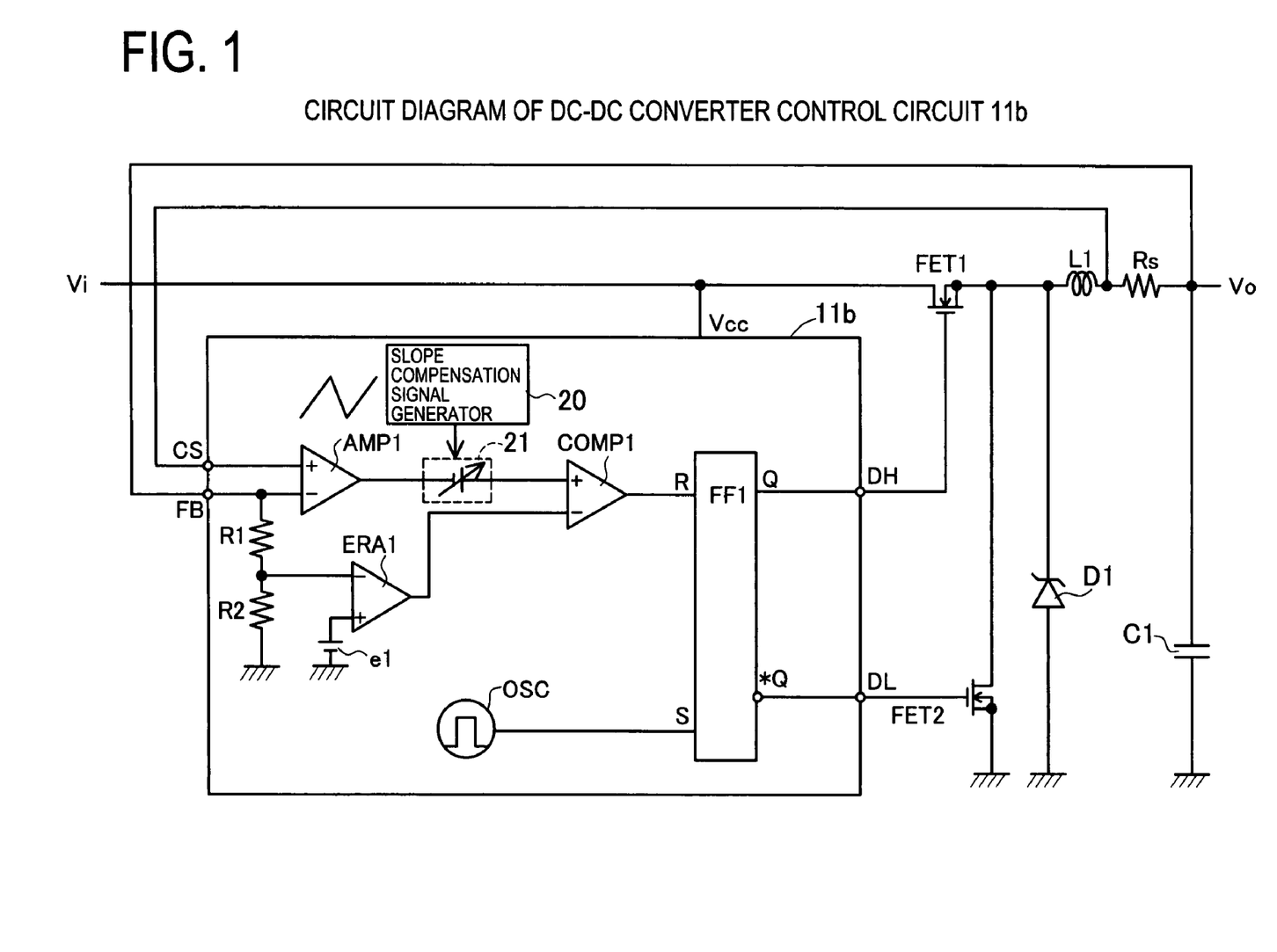
FIG. 1 is a circuit diagram of DC-DC converter control circuit 11b.

First and second preferred embodiments of the invention are described by referring to FIG. 1 to FIG. 9. The first preferred embodiment is explained in FIG. 1 to FIG. 4. First, in the case of the on-duty of main transistor exceeding 50%, a conventional method (slope compensation control) for canceling effects of subharmonic oscillation is explained by referring to FIG. 1 and FIG. 2. When the on-duty is 50% or more, as shown in FIG. 12, coil current IL may induce subharmonic oscillation. To avoid such problem, so-called slope compensation control is attempted. FIG. 1 is a circuit diagram of DC-DC converter control circuit 11b for slope compensation control. The DC-DC converter control circuit 11b comprises, in addition to a conventional DC-DC converter control circuit 101, a slope compensation signal generator 20, and a signal synthesis unit 21. Other structure is same as in the DC-DC converter 100 in FIG. 11, and the explanation is omitted.

Figure 2:
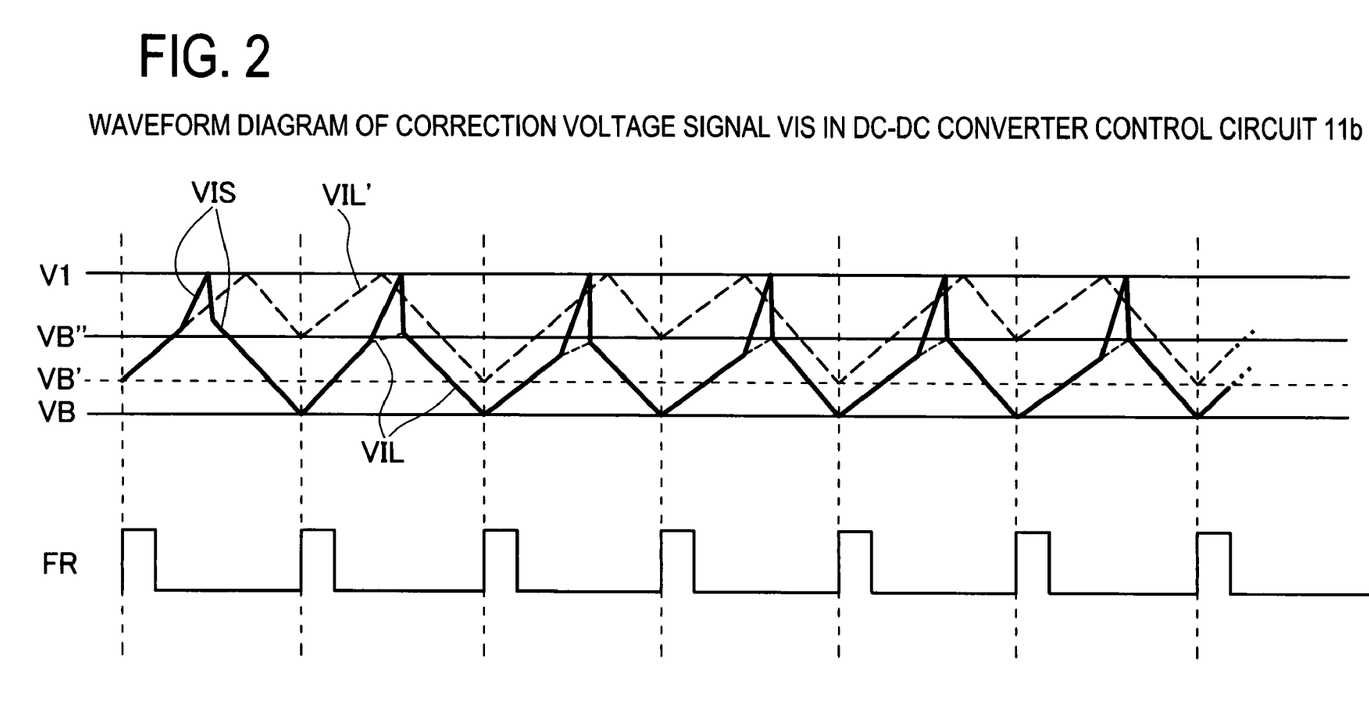
FIG. 2 is a waveform diagram of correction voltage signal VIS in DC-DC converter control circuit 11b.

FIG. 2 shows a waveform of output voltage signal VIL of voltage amplifier AMP1, and a waveform of correction voltage signal VIS of signal synthesis unit 21 in DC-DC converter control circuit 11b. By way of comparison, the diagram also shows a waveform of output voltage signal VIL' not undergoing correction. Output voltage signal VIL (dotted line in FIG. 2) shows coil current IL flowing in choke coil L1. The lower limit of output voltage signal VIL is determined by the leading edge of reference clock signal FR output from oscillator OSC. Output voltage signal VIL shows a ramp waveform. At the lower limit of output voltage signal VIL', lower limit voltages VB', VB" are repeated, and subharmonic oscillation is induced.

In the signal synthesis unit 21, slope compensation signal output from slope compensation signal generator 20 is superposed on output voltage signal VIL. As a result, correction voltage signal VIS output from the signal synthesis unit 21 is increased in the tilt angle of waveform. In other words, the current flowing in the choke coil L1 appears to be larger. Hence, at an earlier timing than the output voltage signal VIL, the correction voltage signal VIS reaches up to the error amplified signal V1. For the ease of understanding of operation, after reaching V1, the slope compensation signal is nullified to zero. After the correction voltage signal VIS has reached the error amplified signal V1, the correction voltage signal VIS is equal to output voltage signal VIL, and VIL drops earlier than VIL'. Repeating this operation, the lower limit of output voltage signal VIL is controlled to settle at a constant lower limit voltage VB.

Thus, by slope compensation control, the turning-off timing of main transistor FET1 can be controlled so that the lower limit of corrected output voltage signal VIL may settle at a constant lower limit voltage VB. As a result, subharmonic oscillation is prevented.

However, correction voltage signal VIS is obtained by superposing a correction waveform on the waveform of output voltage signal VIL expressing the current actually flowing in the choke coil L1. The amount of current of coil current IL expressed by correction voltage signal VIS is smaller by the correction amount than the amount of current of coil current IL actually flowing in the choke coil L1. That is, by the correction voltage signal VIS, the current that should be VIL' is lowered to VIL, which does not express correctly the actual amount of current of choke coil L1. Hence, by slope compensation, in region of on-duty of main transistor FET1 exceeding 50%, the output current is lowered, and it was a problem. In particular, where the on-duty exceeds 80%, a large slope compensation signal is needed for preventing subharmonic oscillation, and increase of lowering rate of output current was a serious problem.

Figure 3:
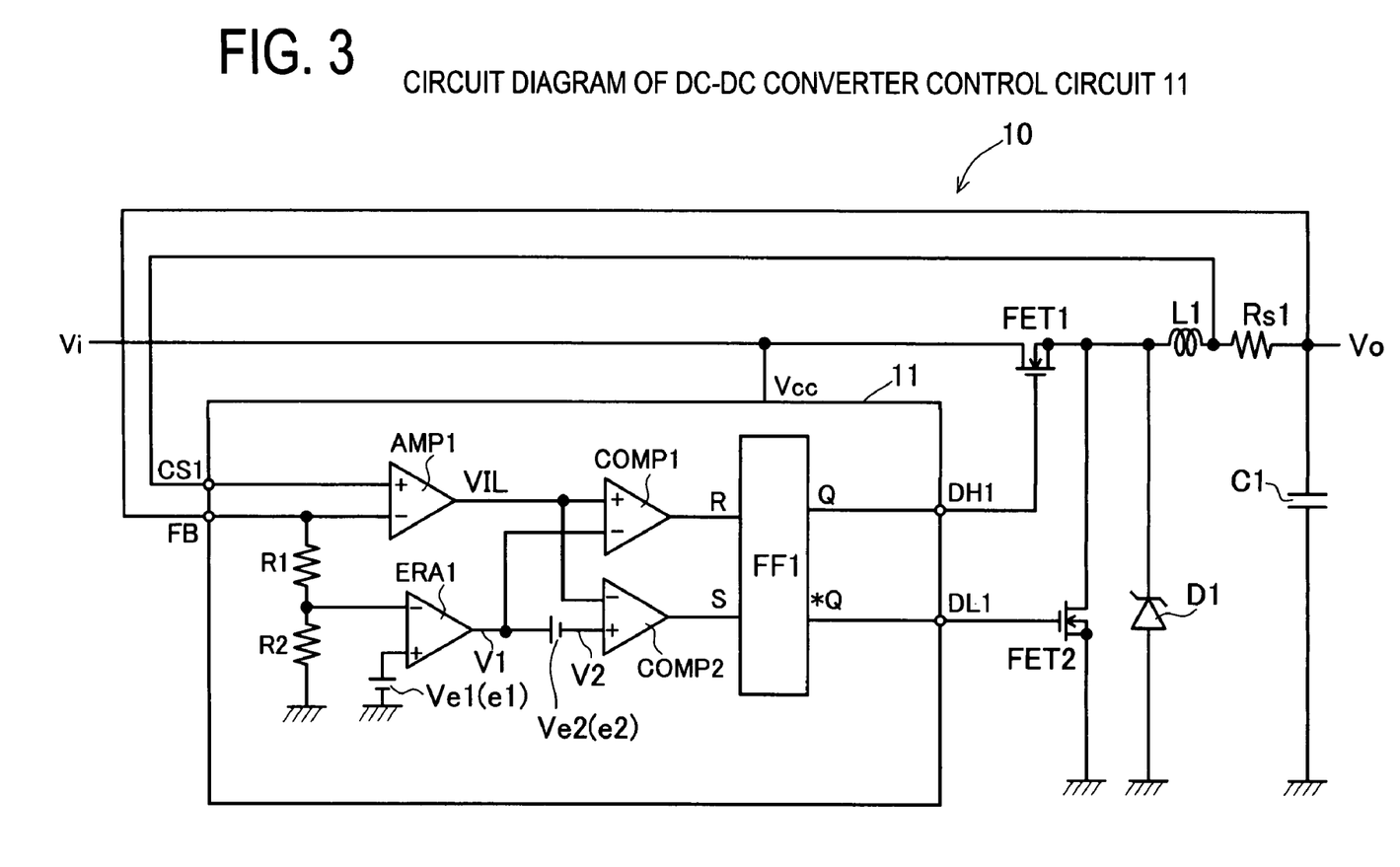
FIG. 3 is a circuit diagram of DC-DC converter control circuit 11.

The DC-DC converter control circuit 11 of the first preferred embodiment of the invention is explained by referring to FIG. 3. The DC-DC converter control circuit 11 is a control circuit of current mode control type DC-DC converter capable of preventing subharmonic oscillation without making slope compensation control even if the on-duty of DC-DC converter 10 exceeds 50%.

The DC-DC converter 10 comprises a DC-DC converter control circuit 11, a choke coil L1, a main transistor FET1, a synchronous rectifying transistor FET2, a flywheel diode D1, a capacitor C1, and a current sense resistor Rs1.

The main transistor FET1 and synchronous rectifying transistor FET2 are turned on or off by the DC-DC converter control circuit 11. The synchronous rectifying transistor FET2 is a switch for releasing the energy accumulated in the choke coil L1, and is made to conduct while the main transistor FET1 is in non-conductive state. The choke coil L1 is a coil for converting the voltage. The flywheel diode D1 is a diode for releasing the energy accumulated in the choke coil L1, and is turned on while the main transistor FET1 is turned off. The capacitor C1 is a smoothing capacitor for output voltage Vo. The current sense resistor Rs1 is a current sense resistance for detecting the coil current IL flowing in the choke coil L1.

The DC-DC converter control circuit 11 is a circuit for controlling the entire DC-DC converter 10. The DC-DC converter control circuit 11 comprises a voltage amplifier AMP1, an error amplifier ERA1, voltage comparators COMP1 and COMP2, a flip-flop FF1, resistance elements R1 and R2, a reference voltage unit Ve1 (reference voltage e1), and an offset voltage unit Ve2 (offset voltage e2).

The voltage amplifier AMP1 is a voltage amplifier for detecting the voltage generated by the current flowing in the current sense resistor Rs1. From the voltage amplifier AMP1, an output voltage signal VIL is output. The output voltage signal VIL is proportional to the coil current IL.

The error amplifier ERA1 is an error amplifier for amplifying the difference between the output voltage Vo of DC-DC converter 10 and reference voltage e1. The resistance elements R1 and R2 are voltage dividing resistors for dividing the output voltage Vo of the DC-DC converter 10. The resistance values of the resistance elements R1 and R2 are set so that the divided voltage may be equal to the reference voltage e1 when the voltage of the output voltage Vo is a specified value. The voltage divided by the resistance elements R1 and R2 is put into an inverting input terminal of the error amplifier ERA1. The reference voltage e1 is put into a non-inverting input terminal. From the error amplifier ERA1, an error amplified signal V1 is output.

The voltage comparator COMP1 is a voltage comparator for comparing the error amplified signal V1 output from the error amplifier ERA1, and the voltage of the output voltage signal VIL output from the voltage amplifier AMP1. The output terminal of the voltage comparator COMP1 is connected to reset terminal R of the flip-flop FF1. Similarly, the voltage comparator COMP2 is a voltage comparator for comparing the lower limit set voltage V2 output from the offset voltage unit Ve2, and the output voltage signal VIL. The output terminal of the voltage comparator COMP2 is connected to set terminal S of the flip-flop FF1.

The offset voltage unit Ve2 receives the error amplified signal V1. The offset voltage unit Ve2 outputs a lower limit set voltage V2 obtained by subtracting offset voltage e2 from the error amplified signal V1. That is, the offset voltage unit Ve2 operates to set the voltage value (lower limit set voltage V2) for determining the lower limit of the output voltage signal VIL by subtracting the offset voltage e2 from the error amplified signal V1 determining the upper limit of the output voltage signal VIL.

Output terminal Q of flip-flop FF1 is connected to the gate of main transistor FET1. From the output terminal Q, a signal DH1 is output, and while the signal DH1 is at high level, the main transistor FET1 conducts, and while at low level, the main transistor FET1 does not conduct. Similarly, output terminal *Q of flip-flop FF is connected to the gate of synchronous rectifying transistor FET2. From the output terminal *Q, a signal DL1 is output, and while the signal DL1 is at high level, the synchronous rectifying transistor FET2 conducts, and while at low level, the synchronous rectifying transistor FET2 does not conduct.

Figure 4:
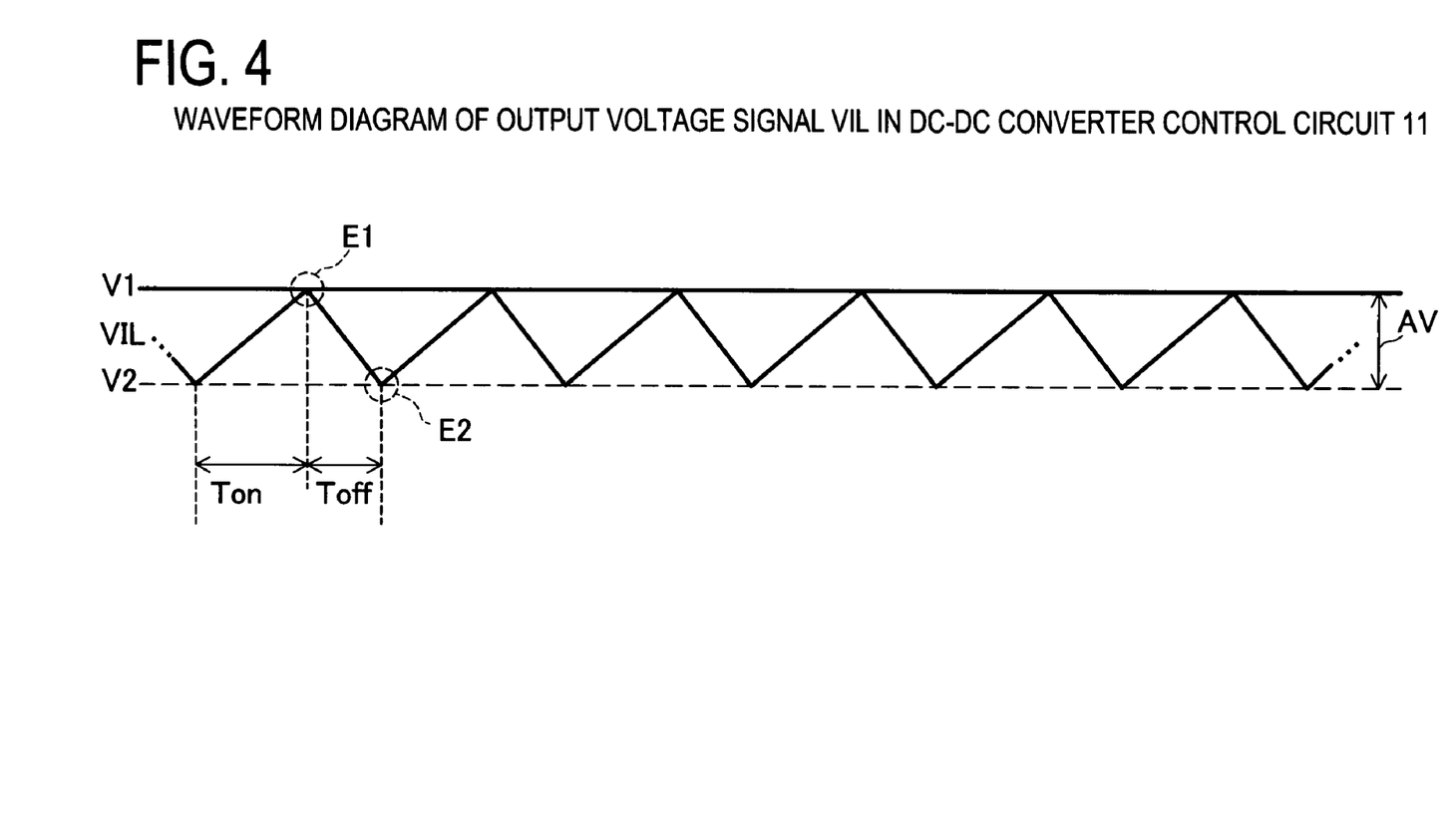
FIG. 4 is a waveform diagram of output voltage signal VIL in DC-DC converter control circuit 11.

The operation of the DC-DC converter control circuit 11 is explained by referring to FIG. 3 and FIG. 4. In FIG. 3, when the main transistor FET1 is turned on, a current flows in the choke coil L1 from input Vi by way of main transistor FET1, and is supplied to the load. In the conductive period (energy supply period) of the main transistor FET1, the coil current IL increases. At this time, supposing the inductance of choke coil L1 to be L, and the on-time of main transistor FET1 to be Ton, the coil current ΔIL increasing in the period of Ton is expressed in the following formula.

$$\Delta IL = (Vi - Vvout)/L \times Ton$$

The output voltage signal VIL output from the voltage amplifier AMP1 is proportional to the coil current IL. Supposing the proportional constant to be A, the output voltage signal ΔVIL increasing in the period of Ton is expressed in the following formula.

$$\Delta VIL = A \times (Vi - Vout)/L \times Ton \quad (1)$$

FIG. 4 is a waveform diagram of output voltage signal VIL, error amplified signal V1, and lower limit set voltage V2. In FIG. 4, the amplitude AV is the same value as offset voltage e2. When the voltage value of output voltage signal VIL reaches the error amplified signal V1 (region E1), the output signal of voltage comparator COMP1 changes from low level to high level. When the high level signal is put in the reset terminal R, the flip-flop FF1 is reset. The signal DH1 is set to low level, and the main transistor FET1 does not conduct. Or the signal DL1 is set to high level, and the synchronous rectifying transistor FET2 conducts.

When the main transistor FET1 is in non-conductive state and the synchronous rectifying transistor FET2 is in conductive state, the current energy accumulated in the coil L1 is discharged to the load by way of the synchronous rectifying transistor FET2. By this discharge, the coil current IL decreases with the lapse of time. At this time, supposing the off-time of the main transistor FET1 to be Toff, the coil current ΔIL decreasing in the period of Toff is expressed in the following formula.

$$\Delta IL = Vout/L \times Toff$$

The output voltage signal VIL is proportional to the coil current IL. Supposing the proportional constant to be A, the output voltage signal ΔVIL decreasing in the period of Toff is expressed in the following formula.

$$\Delta VIL = A \times Vout/L \times Toff \quad (2)$$

Along with decrease of coil current IL, the output voltage signal VIL also decreases. In FIG. 4, when the voltage value of output voltage signal VIL decreases to lower limit set voltage V2 (region E2), the output of voltage comparator COMP2 changes from low level to high level. When the high level signal is put in the set terminal S, the flip-flop FF1 is set. The signal DH1 is set to high level, and the main transistor FET1 conducts. Or the signal DL1 is set to low level, and the synchronous rectifying transistor FET2 does not conduct. A current flows from input Vi into choke coil L1 by way of main transistor FET1, and the amount of current of the coil current IL begins to increase again.

By repeating such operation, a waveform of output voltage signal VIL shown in FIG. 4 is obtained. As known from FIG. 4, since the increment of output voltage signal VIL in period Ton, and the decrement of output voltage signal VIL in period Toff are equal to each other, the following formula is established.

$$A \times (Vi - Vout)/L \times Ton = A \times Vout/L \times Toff$$

$$Vo = Ton/(Ton + Toff) \times Vi \quad (3)$$

From formula 3, it is known to be possible to control the output voltage Vo by on/off period of main transistor FET1, that is, Ton, Toff. At this time, as shown in FIG. 4, the lower limit of waveform of output voltage signal VIL is set uniformly to a constant voltage value of lower limit set voltage V2. Hence, generation of subharmonic oscillation of coil current IL can be prevented.

As specifically described herein, in the DC-DC converter control circuit 11 in the first preferred embodiment, the value obtained by subtracting a specified voltage from the upper limit set value of the coil current IL is set as lower limit set value. When the coil current IL reaches the upper limit set value, the main transistor FET1 is controlled to be in non-conductive state, and when the coil current IL reaches the lower limit set value, the main transistor FET1 is in conductive state. Thus, the DC-DC converter control circuit 11 directly controls the coil current IL so that the lower limit of the coil current IL may come to the lower limit set value.

As a result, the lower limit of the coil current IL is set uniformly to a constant value. Hence, in the current mode control type DC-DC converter for controlling the duty by turning off and controlling the main transistor FET1 by detecting the current flowing in the choke coil L1, if the on-duty exceeds 50%, subharmonic oscillation of coil current can be prevented.

Further, it is not required to superpose correction waveform such as slope compensation on the waveform of output voltage signal. Hence, the amount of current of coil current IL flowing actually in choke coil L1 can be detected correctly. Therefore, even in the region of the on-duty exceeding 50%, drop of output current can be prevented while preventing subharmonic oscillation of coil current.

On the basis of the error amplified signal V1 output from the error amplifier ERA1, the value obtained by subtracting the offset voltage e2 from the error amplified signal V1 is set as lower limit set voltage V2. As a result, following the variation of error amplified signal V1, the lower limit set voltage V2 also varies, and the amplitude AV is maintained at a constant value. Hence, by variation of error amplified signal V1, it is possible to suppress variation on the switching frequency f of the main transistor FET1. Herein, the average value of VIL is the average value of coil current IL, that is, the output current to the load, and variation of V1 indicates variation of load current.

A second preferred embodiment of the invention is described by referring to FIG. 5 to FIG. 9. A DC-DC converter control circuit 11a of the second preferred embodiment is similar to the DC-DC converter control circuit 11 in the first preferred embodiment, and further includes a function of suppressing variation of switching frequency of main transistor due to variation of input voltage.

The on-duty of main transistor FET1 of step-down DC-DC converter is determined by the ratio of input voltage and output voltage. In the system of DC-DC converter control circuit 11 as explained in the first preferred embodiment, in which the main transistor FET1 is turned on or off by fixing the increment or decrement of coil current IL at a specified value, when the input voltage is changed, it is characteristic that the switching frequency of the main transistor FET1 is also changed.

Let us discuss the switching frequency f of main transistor FET1 in the DC-DC converter control circuit 11 in the first preferred embodiment. The coil current ΔIL in period Ton is expressed in the following formula.

$$\Delta IL = (Vi - Vout)/L \times Ton \quad (4)$$

The coil current ΔIL in period Toff is expressed in the following formula.

$$\Delta IL = Vout/L \times Toff \quad (5)$$

The switching frequency f is expressed in the following formula.

$$Ton + Toff = 1/f \quad (6)$$

The value of coil current ΔIL is set equal to the value of offset voltage e2.

From formula 4 to formula 6, the following formula is established.

$$\Delta IL = e2 = Vout/(L \times f) - (Vout)^2/(L \times f \times Vi) \quad (7)$$

Modifying formula 7 in terms of switching frequency f, the following formula is obtained.

$$f = Vo/e2 \times (1/L - Vo/(L \times Vi)) \quad (8)$$

In formula 8, the switching frequency f is expressed by the function of output voltage Vo, input voltage Vi, and offset voltage e2. Hence, by controlling the offset voltage e2 depending on variation of input voltage Vi, it is known that the switching frequency f can be controlled at a constant value. In an actual circuit, however, it is not realistic to vary and control the value of offset voltage e2 depending on the value of input voltage so as to establish the above formula 8. Accordingly, a reference clock signal is prepared, and the offset value is automatically adjusted so that the switching frequency f may be the same as the frequency of reference clock signal, the switching frequency f is controlled to a constant value. This method is explained below.

Figure 5:
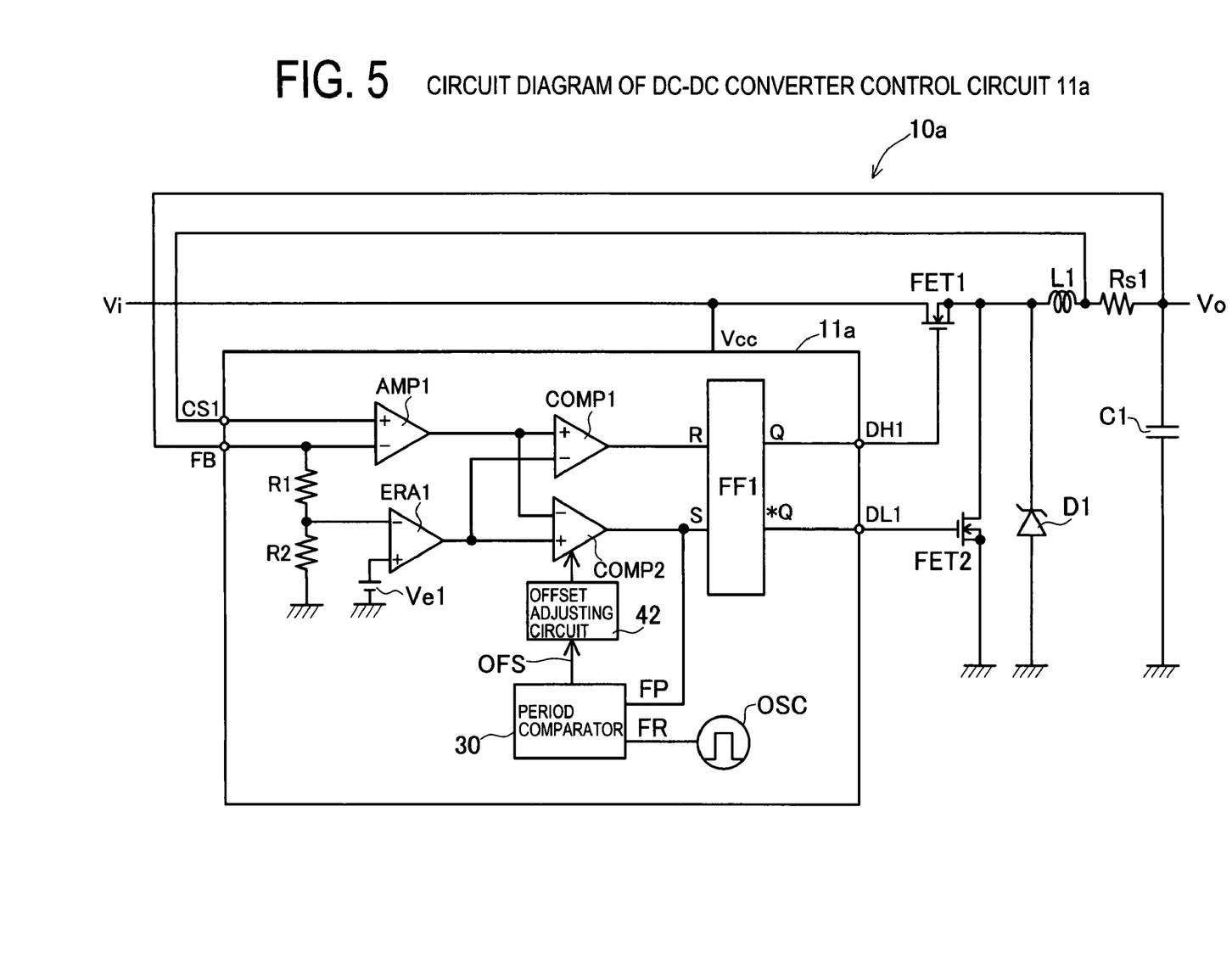

In FIG. 5, the DC-DC converter control circuit 11a compares the period of reference clock signal FR of oscillator OSC, and the period of set signal FP output from the voltage comparator COMP2. When the period of set signal FP is shorter than the period of reference clock signal FR, the offset voltage e2 (amplitude AV in FIG. 4) is increased, and it is controlled to lower the switching frequency of DC-DC converter. To the contrary, when the period of set signal FP is longer than the period of reference clock signal FR, the offset voltage e2 (amplitude AV in FIG. 4) is decreased, and it is controlled to raise the switching frequency of DC-DC converter. In this way, the DC-DC converter control circuit 11a is a circuit for automatically adjusting the value of offset voltage e2 so that the switching period of main transistor FET1 may coincide with the period of reference clock signal FR.

The duration of switching period and period of reference clock signal FR can be detected in various methods. In the second preferred embodiment, the duration of period is judged by measuring the phase difference of reference clock signal FR and set signal FP. The offset voltage e2 may be adjusted also in various methods. In the second preferred embodiment, the offset value is adjusted by adjusting the current flowing in the voltage comparator COMP2.

FIG. 5 shows the DC-DC converter 10a using the DC-DC converter control circuit 11a of the second preferred embodiment. The DC-DC converter control circuit 11a comprises a period comparator 30, an oscillator OSC, a voltage comparator COMP2, and an offset adjusting circuit 42. A set signal FP output from the voltage comparator COMP2 is put into flip-flop FF1 and period comparator 30. A reference clock signal FR output from the oscillator OSC is put into period comparator 30. An offset signal OFS output from period comparator 30 is put into offset adjusting circuit 42. The offset adjusting circuit 42 is connected to the voltage comparator COMP2. The other configurations are the same as in the DC-DC converter control circuit 11 (FIG. 3) in the first preferred embodiment, and explanation is omitted.

Figure 6:
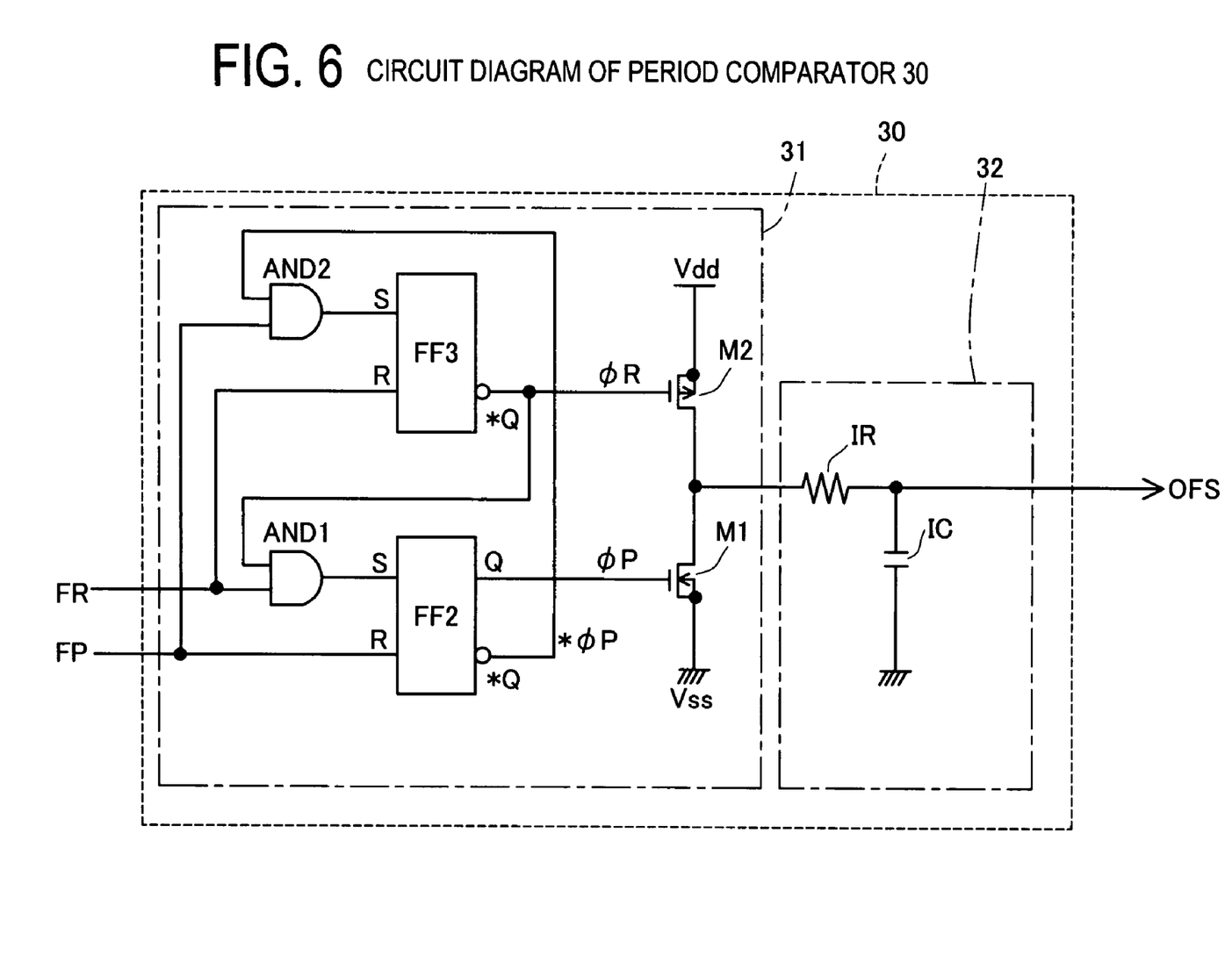
FIG. 6 is a circuit diagram of period comparator 30.

FIG. 6 shows a structure of period comparator 30. The period comparator 30 comprises a comparator 31 and an integrator 32. The comparator 31 includes flip-flops FF2 and FF3, AND gates AND1 and AND2, and transistors M1 and M2. The comparator 31 receives reference clock signal FR and set signal FP. A set signal FP is put into reset terminal R of flip-flop FF2. An output terminal of AND gate AND1 is connected to set terminal S. The AND gate AND1 receives signal φR output from output terminal *Q of flip-flop FF3, and reference clock signal FR. Output terminal Q of flip-flop FF2 outputs signal φP. The flip-flop FF3 is connected similarly, and description is omitted.

Between supply voltage Vdd and grounding voltage Vss, transistors M2 and M1 are connected. Signal φR is put into the gate of transistor M2. Signal φP is put into the gate of transistor M1. Drains of two transistors are commonly connected and further connected to the integrator 32. The integrator 32 includes resistance element IR and capacitance element IC. The integrator 32 outputs an offset signal OFS.

Figure 7:
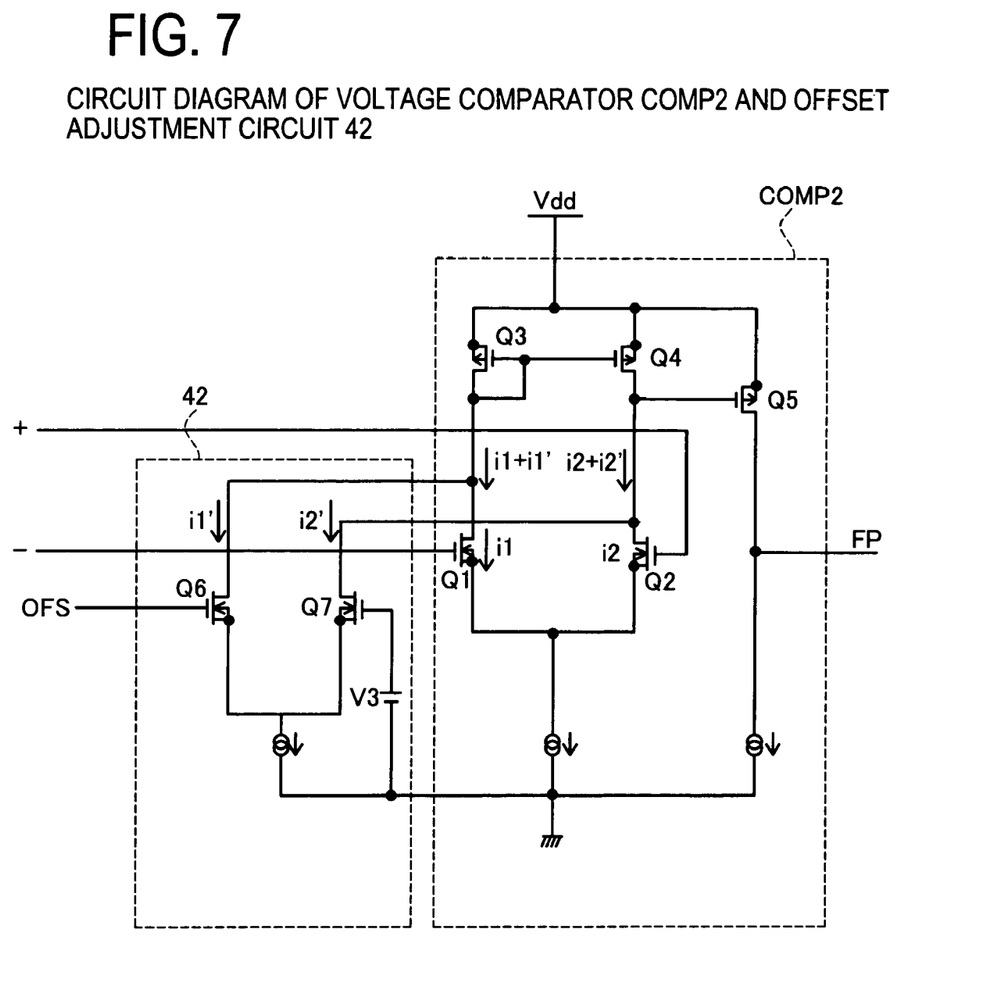
FIG. 7 is a circuit diagram of voltage comparator COMP2 and offset adjustment circuit 42.

FIG. 7 is a block diagram of voltage comparator COMP2 and offset adjusting circuit 42. The voltage comparator COMP2 includes transistors Q1 to Q5. The gate of transistor Q1 which is an inverting input terminal is connected to the output terminal of voltage amplifier AMP1. The gate of transistor Q2 which is a non-inverting input terminal is connected to the output terminal of error amplifier ERA1.

By transistors Q3 and Q4, a current mirror circuit is composed. The voltage comparator COMP2 outputs a set signal FP.

The offset adjusting circuit 42 is connected parallel to the voltage comparator COMP2. Transistor Q6 is provided parallel to transistor Q1. Transistor Q7 is provided parallel to transistor Q2. A specified reference voltage V3 is applied to the gate of transistor Q7. An offset signal OFS output from the period comparator 30 is put into the gate of transistor Q6. Herein, when the transistors Q1 and Q2, and transistors Q6 and Q7 are same in size, a voltage difference of reference voltage V3 and offset signal OFS becomes an offset voltage (value of amplitude AV in FIG. 4).

The operation of period comparator 30 (FIG. 6) is explained. Along with variation of input voltage, if the phase of set signal FP is delayed from the phase of reference clock signal FR (FIG. 8), the operation is as follows. At time T0, the phase of reference clock signal FR and the phase of set signal FP coincide with each other, and this is a stationary state. At this time, a voltage depending on the stationary state is held in capacitance element IC of integrator 32. When input voltage varies after lapse of time T0, the period of set signal FP is increased to become, for example, period PF0. At time T1, the AND gate AND1 (FIG. 6) receives a reference clock signal FR of high level and signal *φR of high level. As a result, the high level signal output from the AND gate AND1 is put into set terminal S of flip-flop FF2. As a result, signal φP is changed to high level (arrow Y1).

At time T2, a set signal FP of high level delayed by period P1 from the reference clock signal FR is put into reset terminal R of flip-flop FF2. As a result, signal φP is changed to low level (arrow Y2). Consequently, the flip-flop FF2 generates signal φP, which is a positive pulse signal of the same duration as time difference (period P1) by phase delay.

While signal φP is at high level, transistor M1 conducts, and capacitance element IC of integrator 32 is discharged. Accordingly, the voltage value of offset signal OFS which is the output of the integrator 32 decreases along with the conduction time of transistor M1. That is, depending on the differential time of period of reference clock signal FR and set signal FP, the voltage value of offset signal OFS is controlled.

The offset signal OFS is put into an offset adjusting circuit 42 (FIG. 7). This is to explain a method of adjusting the offset value by the offset adjusting circuit 42. Suppose the currents flowing in transistors Q1 and Q2 to be currents i1 and i2. Suppose the currents flowing in transistors Q6 and Q7 to be currents i1' and i2'. In transistors Q3 and Q4, currents i1+i1' and i2+i2' flow. Since the transistors Q3 and Q4 are current mirror circuits, when currents i1+i1' and i2+i2' are matched, the gate voltage of output transistor Q5 varies, and a set signal FP is output. At this time, a current (i1+i1')−(i2+i2') flows in the gate of the output transistor Q5. Hence, by controlling the values of i1' and i2', an offset voltage appears to be present on the operation characteristic of the voltage comparator COMP2.

Figure 8:
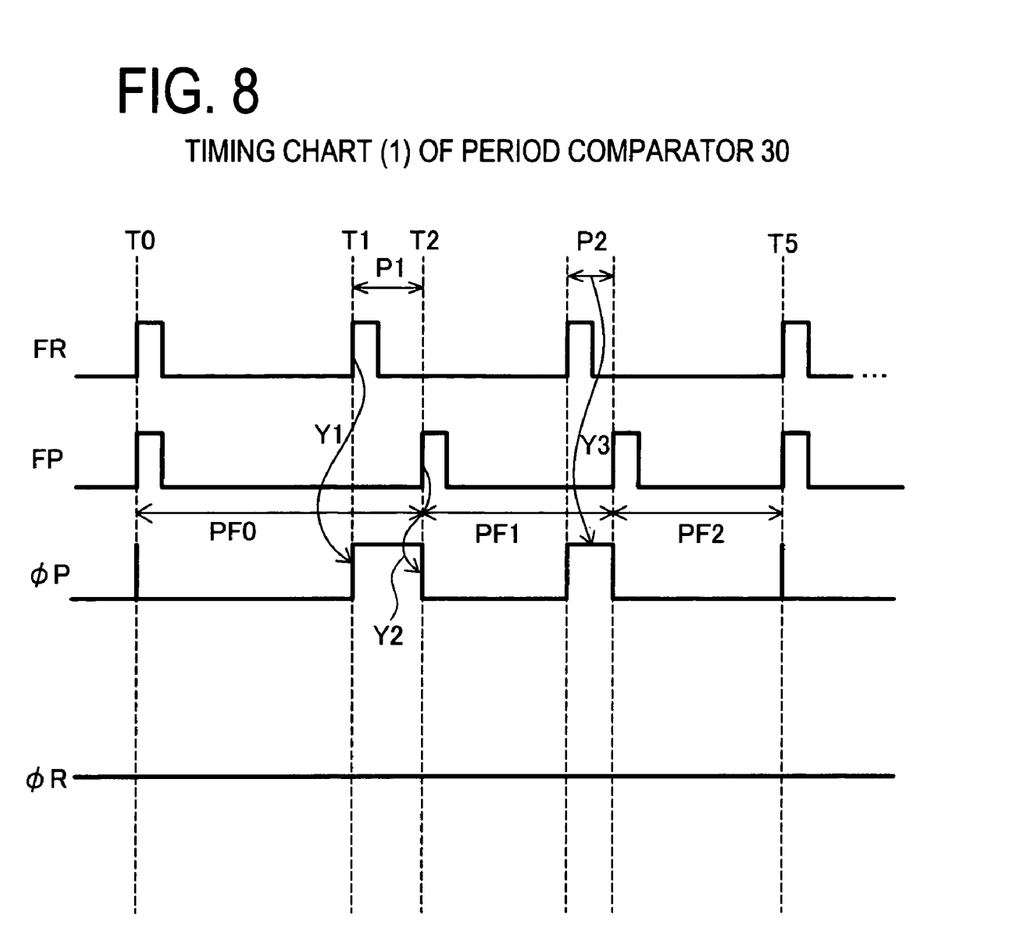
FIG. 8 is a timing chart (1) of period comparator 30.

At time T0, an offset voltage (differential voltage of reference voltage V3 and offset signal OFS) is set automatically so that the reference clock signal FR and set signal FP may coincide in period. Next, at time T1, when a phase difference occurs between the both signals, the offset signal OFS is lowered depending on the phase difference (duration of period P1). Consequently, the differential voltage of reference voltage V3 and offset signal OFS becomes smaller, and the offset voltage is lowered. As a result, same effects as when the amplitude AV is decreased in FIG. 4 are obtained. Hence, the period of set signal FP is shortened, and becomes period PF1 (FIG. 8).

The same operation is repeated hereinafter. That is, in next cycle, a positive pulse signal φP of the same duration as period P2 is generated (arrow Y3). In proportion to the time length of signal φP, the transistor M1 conducts, and the voltage value of offset signal OFS further decreases. As the offset signal OFS becomes smaller, current i1' and off set value are also decreased. As a result, the period of set signal FP is further shortened, and becomes period PF2 (FIG. 8). As a result, as indicated at time T5, the phase difference of reference clock signal FR and reset signal FP becomes zero.

Thus, when the phase of set signal FP is delayed from the phase of reference clock signal FR, the offset value is reduced depending on the phase difference, so that the phase difference can be eliminated.

Figure 9:
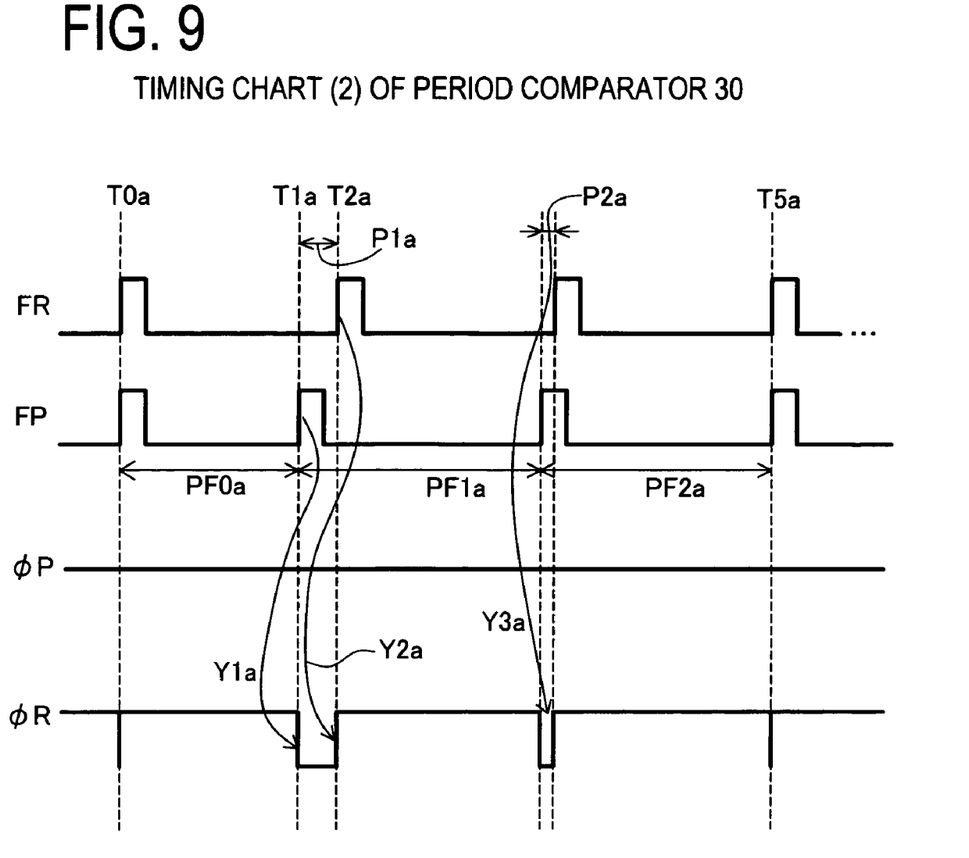
FIG. 9 is a timing chart (2) of period comparator 30.

FIG. 9 explains a case of advancement of phase of set signal FP from the phase of reference clock signal FR due to variation of input voltage. After lapse of time T0a, when the input voltage varies, the period of set signal FP is shortened to become, for example, PF0a. In such a case, at time T1a, high level set signal FP and high level signal *φP are entered in the AND gate AND2 (FIG. 6). Hence, a high level signal output from the AND gate AND2 is put into set terminal S of flip-flop FF3, and the signal φR is changed to low level (arrow Y1a).

At time T2a, a high level reference clock signal FR delayed by period P1a from the set signal FP is put into reset terminal R of flip-flop FF3. Hence, the signal φR is changed to high level (arrow Y2a). Accordingly, the flip-flop FF3 can generate signal φR, which is a negative pulse signal of the same duration as time difference (period P1a) due to phase delay.

While the signal φR is at low level, the transistor M2 conducts, and the capacitance element IC of the integrator 32 is charged. Hence, the voltage value of offset signal OFS elevates depending on the conduction duration of transistor M2. As a result, the differential voltage of reference voltage V3 and offset signal OFS increases, and the offset voltage becomes higher. As a result, same effects as when the amplitude AV is increased in FIG. 4 are obtained. Hence, the period of set signal FP is extended, and becomes period PF1a.

The same operation is repeated hereinafter. That is, in next cycle, a negative pulse signal φR of the same duration as period P2a is generated (arrow Y3a). In proportion to the time length of signal φR, the transistor M2 conducts, and the voltage value of offset signal OFS further elevates, and the offset value increases. The period of set signal FP is further extended to become period FP2a (FIG. 9). As a result, as indicated at time T5a, the phase difference of reference clock signal FR and set signal FP becomes zero.

Thus, when the phase of set signal FP is advanced from the phase of reference clock signal FR, the offset value is increased depending on the phase difference, so that the phase difference can be eliminated.

As explained herein, in the DC-DC converter control circuit 11a of the second preferred embodiment, the offset value is adjusted automatically so as to match the switching frequency f of main transistor FET1 of DC-DC converter with the frequency of reference clock signal FR. Hence, by controlling the switching frequency f of the main transistor FET1 to a constant value, it is possible to suppress the variation of switching frequency due to variation of input voltage.

In particular, in spite of variation of supply voltage due to discharge of battery, the switching frequency of the main transistor FET1 can be controlled to a constant value by using the DC-DC converter 10a of the preferred embodiment. Hence, the DC-DC converter control circuit of the invention is particularly effective in portable type devices or the like operating on batteries in spite of changes in switching frequency of DC-DC converter.

In the second preferred embodiment, it is intended to detect phase difference between the reference clock signal FR and set signal FP. By automatically adjusting the offset value depending on the time length of the phase difference, the switching frequency f can be matched with the frequency of reference clock signal FR. Without resort to feedback control or the like, the both frequencies can be matched in a relatively simple circuit. Hence, the circuit scale is smaller as compared with a case of using PLL circuit or the like.

Figure 10:
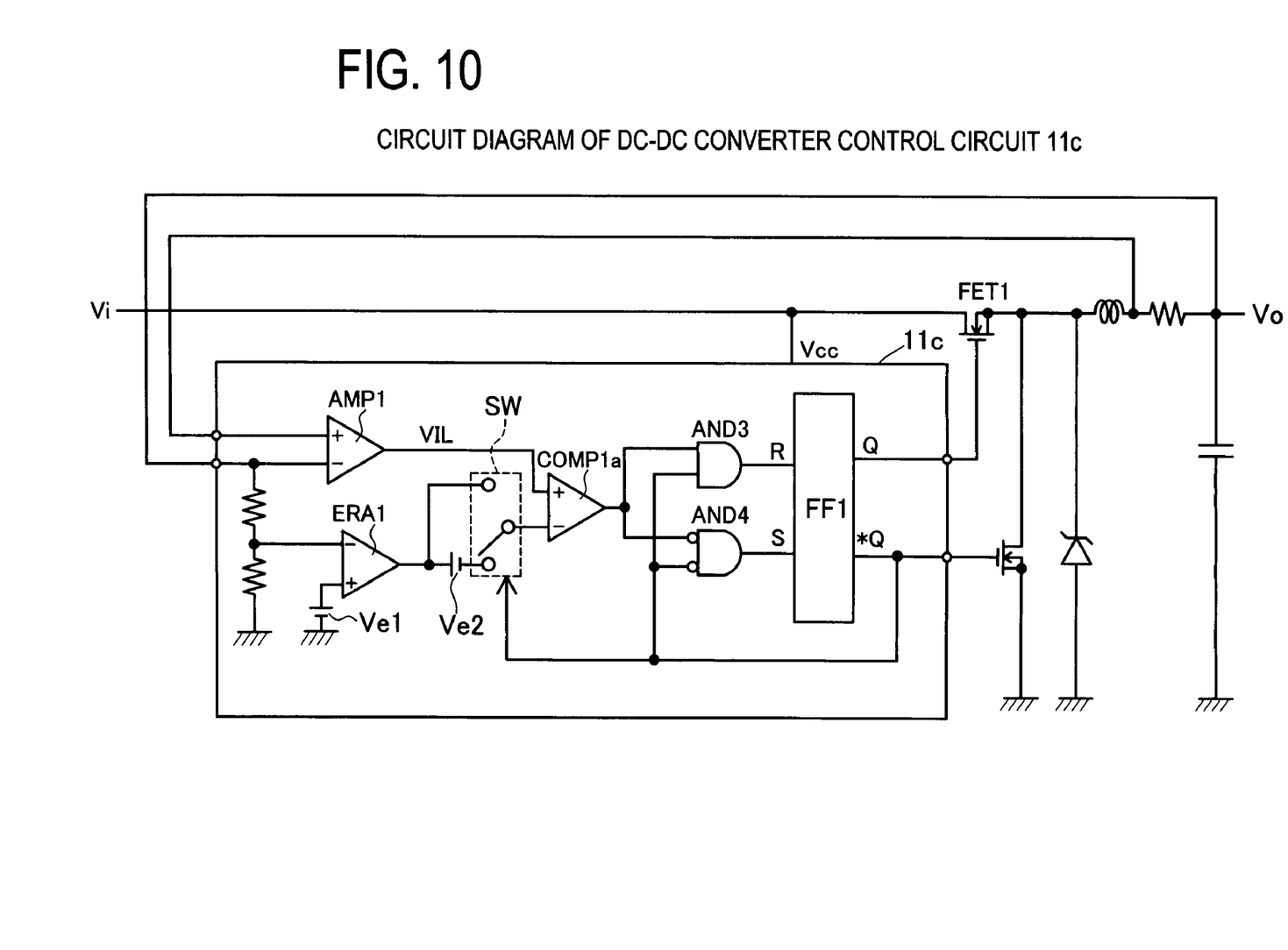
FIG. 10 is a circuit diagram of DC-DC converter control circuit 11c.

The invention is not limited to the foregoing embodiments alone, but may be changed and modified variously within a scope not departing from the true spirit of the invention. In the DC-DC converter control circuit 11 of the first preferred embodiment (FIG. 3), voltage comparators COMP1 and COMP2 are used when comparing the output of voltage amplifier AMP1 and output of error amplifier ERA1, but the invention is not limited to this embodiment alone. Since the voltage comparators COMP1 and COMP2 do not operate at the same time, only one voltage comparator COMP1a may be used as shown in FIG. 10. The DC-DC converter control circuit 11c shown in FIG. 10 comprises, aside from the DC-DC converter control circuit 11 (FIG. 3) of the first preferred embodiment, a switch unit SW and AND gates AND3 and AND4. The switch unit SW is a switch for connecting the output terminal of offset voltage unit Ve2 and inverting input terminal of voltage comparator COMP1a in the event of input of high level signal, and connecting the output terminal of error amplifier ERA1 and inverting input terminal of voltage comparator COMP1a in the event of input of low level signal.

When the flip-flop FF1 is in reset state, the main transistor FET1 does not conduct, and the output voltage signal VIL which is the output of the voltage amplifier AMP1 is lowered. At this time, the switch unit SW connects the offset voltage unit Ve2 and voltage comparator COMP1a. The voltage comparator COMP1a operates to detect when the output voltage signal VIL reaches the lower limit (lower limit set voltage V2 output from offset voltage unit Ve2). When the output voltage signal VIL is lowered to the lower limit set voltage V2, the output of the voltage comparator COMP1a is changed to low level, and a high level signal is output from AND gate AND4. Hence the flip-flop FF1 is changed to set state.

When the flip-flop FF1 is in set state, the main transistor FET1 conducts, and the output voltage signal VIL which is the output of the voltage amplifier AMP1 is elevated. At this time, the switch unit SW connects the error amplifier ERA1 and voltage comparator COMP1a. The voltage comparator COMP1a operates to detect when the output voltage signal VIL reaches the upper limit (error amplified signal V1 output from error amplifier ERA1). When the output voltage signal VIL is raised to the error amplified signal V1, the output of the voltage comparator COMP1a is changed to high level, and a high level signal is output from AND gate AND3. Hence the flip-flop FF1 is changed to reset state.

Hence the voltage comparator COMP1a can be operated as a single comparator having hysteresis of voltage width of offset voltage e2. By logical processing with the output of flip-flop FF1, a set/reset signal of flip-flop FF1 can be also generated. Hence, the number of voltage comparators can be curtailed, the circuit scale can be reduced and the power consumption can be saved.

In the second preferred embodiment, as a method of adjusting the offset voltage e2, the current flowing in the voltage comparator COMP2 is adjusted, but it is not limited to this method. For example, the reference voltage of the voltage comparator COMP2 can be changed directly. In FIG. 5, for instance, an offset voltage setting unit may be provided between the error amplifier ERA1 and voltage comparator COMP2. In the offset voltage setting unit, an offset signal OFS output from the period comparator 30 is entered. The offset voltage setting unit subtracts the voltage value corresponding to the offset signal OFS from the output signal of the error amplifier ERA1, and feeds this value into the non-inverting input terminal of the voltage comparator COMP2. In this method, too, by automatically adjusting the offset value, the switching frequency f can be controlled to a constant value.

In the second preferred embodiment, the length of switching period and period of reference clock signal is detected by comparing the phase, but it is not limited to this method. The method is not particularly specified as far as the switching period and period of reference clock signal coincide with each other. For example, both period lengths may be directly compared, and the switching period may be adjusted depending on the difference of period lengths.

In the DC-DC converter control circuit 11a (FIG. 5) in the second preferred embodiment, the period comparator 30 is composed of a relatively simple circuit as shown in FIG. 6, but it is not limited to this circuit configuration. For example, the period comparator may be realized by PLL (phase locked loop).

The voltage amplifier AMP1 is an example of current detector, a set of the error amplifier ERA1 and reference voltage unit Vel is an example of first setting unit, the offset adjusting circuit 42 is an example of second setting unit, the transistor M1 is an example of first switch, the transistor M2 is an example of second switch, and a set of the voltage comparators COMP1 and COMP2, switch unit SW and COMP1a is an example of comparator, respectively.

According to the control circuit and control method of DC-DC converter of the invention, lower limit values of coil current flowing in the choke coil may be set uniformly to a constant value. Hence, even if the on-duty of main transistor is over 50%, subharmonic oscillation of coil current can be prevented. At the same time, lowering of output current can be prevented.

What is claimed is:

1. A current mode control type DC-DC converter control circuit comprising:

a current detector for detecting a coil current value flowing in a choke coil;

a first setting unit for determining an upper limit value of the coil current value;

a second setting unit for determining a lower limit value of the coil current value; and a comparator for comparing the coil current value and the upper limit value outputted from the first setting unit and outputting a signal to set a main transistor in a non-conductive state when detecting the coil current value is higher than the upper limit value; and comparing the coil current value and the lower limit value outputted from the second setting unit and outputting a signal to set the main transistor in a conductive state in response to a comparing result of the coil current value and the lower limit value when detecting the coil current value is lower than the lower limit value, wherein the first setting unit is an error amplifier for receiving a first reference voltage and an output voltage of the current mode control the DC-DC converter, and wherein the second setting unit sets a value obtained by subtracting a specified voltage from the upper limit value as a lower limit value, a phase comparator for detecting the phase difference of a reference period and a switching period of the main transistor, wherein the phase comparator outputs a signal for increasing the specified voltage depending on the phase difference when the phase of the switching period is advanced from the phase of the reference period, or decreasing the specified voltage depending on the phase difference when the phase of the switching period is delayed from the phase of the reference period, and outputting a signal corresponding to a differential voltage of the first reference voltage and the output voltage of the current mode control type DC-DC converter.

2. The current mode control type DC-DC converter control circuit of claim 1, wherein the comparator includes:

a first comparator for comparing the coil current value and upper limit value, and a second comparator for comparing the coil current value and lower limit value.

3. The current mode control type DC-DC converter control circuit of claim 1, wherein the comparator includes:

a switch unit for receiving the upper limit value and the lower limit value, selecting the upper limit value as reference voltage when the main transistor is in conductive state, and selecting the lower limit value as reference voltage when the main transistor is in non-conductive state.

4. The current mode control type DC-DC converter control circuit of claim 1, wherein the phase comparator includes:

an integrator, a first switch for connecting the integrator and first potential, and a second switch for connecting the integrator and second potential, the first switch is set in conductive state depending on the phase difference when the phase of the switching period is advanced from the phase of the reference period, and the second switch is set in conductive state depending on the phase difference when the phase of the switching period is delayed from the phase of the reference period.

5. The current mode control type DC-DC converter control circuit of claim 1, wherein the comparator includes a first differential pair for receiving the coil current value and upper limit value and/or the lower limit value, the second setting unit includes a second differential pair connected parallel to the first differential pair, it is controlled to decrease the current flowing in a transistor of input side of the coil current value out of the first differential pair depending on the phase difference when the phase of the switching period is advanced from the phase of the reference period, and decrease the current flowing in a transistor at the input side of the upper limit value and/or the lower limit value out of the first differential pair depending on the phase difference when the phase of the switching period is delayed from the phase of the reference period.

6. A current mode control type DC-DC converter control method comprising:

detecting a coil current value flowing in a choke coil;

determining an upper limit value of the coil current value; and determining a lower limit value of the coil current value, wherein the coil current value and the upper limit value are compared, and a main transistor is set in non-conductive state when detecting the coil current value higher than the upper limit value, and the coil current value and the lower limit value are compared, and the main transistor is set in conductive state in response to a comparing result of the coil current value and the lower limit value when detecting the coil current value lower than the lower limit value, wherein the upper limited value is a signal corresponding to a differential voltage of a first reference voltage and an output voltage of the current mode control type DC-DC converter, wherein upon determining the upper limit value of the coil current value, the upper limit value is set depending on the differential voltage of first reference voltage and an output voltage of the current mode control type DC-DC converter, and upon determining the lower limit value of the coil current value, the lower limit value is set by obtaining a value by subtracting a specified voltage from the upper limit value, and detecting the phase difference of reference period and switching period of the main transistor, wherein the specified voltage is increased depending on the phase difference when the phase of the switching period is advanced from the phase of the reference period, and the specified voltage is decreased depending on the phase difference when the phase of the switching period is delayed from the phase of the reference period.

* * * * *